(12) United States Patent
Bao et al.

(10) Patent No.: US 8,577,900 B2
(45) Date of Patent: Nov. 5, 2013

(54) METHOD AND APPARATUS FOR ENHANCING WEBPAGE BROWSING

(75) Inventors: Shenghua Bao, Beijing (CN); Jian Chen, Beijing (CN); Lu Cheng En, Beijing (CN); Rui Ma, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/171,767

(22) Filed: Jun. 29, 2011

(65) Prior Publication Data

US 2012/0005192 A1 Jan. 5, 2012

(30) Foreign Application Priority Data

Jun. 30, 2010 (CN) .......................... 2010 1 0218771

(51) Int. Cl.
*G06F 17/30* (2006.01)
(52) U.S. Cl.
USPC ............ 707/751; 707/756; 707/793; 707/800
(58) Field of Classification Search
USPC .................. 707/728, 704, 723, 726, 756, 800
See application file for complete search history.

(56) References Cited

U.S. PATENT DOCUMENTS

| 5,848,396 | A * | 12/1998 | Gerace | 705/7.33 |
|---|---|---|---|---|
| 6,266,649 | B1 * | 7/2001 | Linden et al. | 705/7.29 |
| 6,310,630 | B1 * | 10/2001 | Kulkarni et al. | 715/776 |
| 6,321,179 | B1 * | 11/2001 | Glance et al. | 702/189 |
| 6,321,221 | B1 * | 11/2001 | Bieganski | 705/26.7 |
| 6,334,127 | B1 * | 12/2001 | Bieganski et al. | 1/1 |
| 6,366,910 | B1 * | 4/2002 | Rajaraman et al. | 1/1 |
| 6,438,579 | B1 * | 8/2002 | Hosken | 709/203 |
| 6,460,025 | B1 * | 10/2002 | Fohn et al. | 706/45 |
| 6,460,036 | B1 * | 10/2002 | Herz | 707/748 |
| 6,466,918 | B1 * | 10/2002 | Spiegel et al. | 705/7.29 |
| 6,484,149 | B1 * | 11/2002 | Jammes et al. | 705/26.62 |
| 6,489,968 | B1 * | 12/2002 | Ortega et al. | 715/713 |
| 6,606,102 | B1 * | 8/2003 | Odom | 715/745 |
| 6,606,619 | B2 * | 8/2003 | Ortega et al. | 1/1 |
| 6,757,691 | B1 * | 6/2004 | Welsh et al. | 1/1 |
| 6,853,982 | B2 * | 2/2005 | Smith et al. | 705/26.7 |
| 6,912,505 | B2 * | 6/2005 | Linden et al. | 705/14.53 |
| 6,963,867 | B2 * | 11/2005 | Ford et al. | 707/752 |
| 7,003,503 | B2 * | 2/2006 | Crosby et al. | 706/48 |
| 7,013,300 | B1 * | 3/2006 | Taylor | 1/1 |

(Continued)

FOREIGN PATENT DOCUMENTS

| CN | 101079063 | 11/2007 |
|---|---|---|
| CN | 101216825 | 7/2008 |

*Primary Examiner* — Sherief Badawi
(74) *Attorney, Agent, or Firm* — Jon A. Gibbons; Fleit Gibbons Gutman Bongini & Bianco PL (57) ABSTRACT

The present invention provides a method and apparatus for enhancing webpage browsing. The method of the invention includes a predicting step which predicts, for a first block in the webpage, a subsequent second block, based on a browsing history of blocks of webpages by at least one user; and a link generating step of automatically generating a link pointing to the second block based on a result of the predicting step. The apparatus includes: predicting means configured to predict, for a first block in the webpage, a subsequent second block, based on a browsing history of blocks of web pages by at least one user; and link generating means configured to automatically generate a link pointing to the second block based on a result of the predicting means.

19 Claims, 8 Drawing Sheets

(56) References Cited

U.S. PATENT DOCUMENTS

| | | |
|---|---|---|
| 7,421,432 B1 | 9/2008 | Hoelzle et al. |
| 7,698,626 B2 | 4/2010 | Baluja et al. |
| 2005/0193350 A1* | 9/2005 | Ishiguro et al. ............... 715/794 |
| 2006/0074984 A1* | 4/2006 | Milener et al. ............. 707/104.1 |
| 2009/0158133 A1 | 6/2009 | Serena |
| 2010/0082673 A1* | 4/2010 | Nakano et al. ................ 707/776 |
| 2010/0174735 A1* | 7/2010 | Fiatal ............................ 707/769 |
| 2011/0022945 A1* | 1/2011 | Yang ............................. 715/234 |

* cited by examiner

METHOD AND APPARATUS FOR ENHANCING WEBPAGE BROWSING

CROSS REFERENCE TO RELATED APPLICATION

This application claims priority under 35 U.S.C. 119 from Chinese Application 201010218771.X, filed Jun. 30, 2010, the entire contents of which are incorporated herein by reference.

BACKGROUND OF THE INVENTION

1. Technical Field

The present invention relates to webpage browsing, and more particularly to a method and apparatus for enhancing webpage browsing.

2. Description of the Related Art

Generally, a page such as a webpage contains many hyperlinks (sometimes also called links). With the help of the hyperlinks, various kinds of information such as text, image, video, and other multimedia can be linked together. Hyperlinks can enrich the contents of the webpage and bring great convenience to users.

Some webpages have already been provided with links for the convenience of the user's browsing. For example, by clicking a currently displayed image, a next image can be displayed. In general, such links are set by webpage developers while designing the webpages.

Some webpages can provide the user with links to other contents related to the contents on the webpages, based on relevance between the contents. For example, a link to a sports website can be added to the text "sports" in a webpage.

Although hyperlinks enhance user's browsing experiences, many webpages fail to provide sufficient hyperlinks capable of satisfying the user's browsing requirements. Moreover, the links added by the webpage developer while designing the webpage sometimes cannot satisfy the user's browsing requirements.

SUMMARY OF THE INVENTION

To overcome these deficiencies, the present invention provides a method for enhancing webpage browsing, the webpage containing blocks, the method including: predicting, for a first block in the webpage, a subsequent second block, based on a browsing history of blocks of webpages by at least one user; and automatically generating a link pointing to the second block based on a result of the predicting.

According to another aspect of the invention, the present invention provides a method, performed by a client for webpage browsing, for enhancing webpage browsing, the webpage containing blocks, the method including: predicting, for a first block in the webpage, a subsequent second block, based on a browsing history of blocks of webpages by at least one user; and automatically generating a link pointing to the second block based on a result of the predicting.

According to another aspect of the invention, the present invention provides an apparatus for enhancing webpage browsing, the webpage containing blocks, the apparatus including: predicting means configured to predict, for a first block in the webpage, a subsequent second block, based on a browsing history of blocks of webpages by at least one user; and link generating means configured to automatically generate a link pointing to the second block based on a result of the predicting means.

BRIEF DESCRIPTION OF THE SEVERAL VIEWS OF THE DRAWINGS

The present invention per se, preferred embodiments thereof, and other objects and advantages thereof will be better understood by describing in detail illustrative embodiments of the invention in combination with the accompanying drawings, in which.

DETAILED DESCRIPTION OF THE PREFERRED EMBODIMENTS

Although the invention will be described below by means of the accompanying drawings and the embodiments of the invention, the embodiments are not intended to limit the scope of the invention. In addition, not all the features described in the embodiments are necessary for solving the technical problem of the invention.

Webpage developers often need to add many hyperlinks into a webpage while designing the webpage, which greatly increases the burden on webpage developers.

Moreover, a portable electronic device, such as a mobile phone capable of accessing the Internet is often inconvenient to use for browsing webpages. For example, since the portable device has a screen smaller than that of a normal computer display, fewer contents are displayed on each screen, and thus the user often has to take a great deal of time to find desired content or a link. Moreover, since the screen is small, the display of a scrollbar or linking icon is potentially very small, making it difficult for the user to find or accurately locate the icon, thereby resulting in wrong or invalid clicks.

Furthermore, the user may possibly face other problems while browsing webpages. For example, after the user finishes browsing contents in a page, he or she usually needs to return to the previous page and then click into a next new page. As another example, in some websites, users are usually required to click an advertisement in order to then enter a desired webpage. As yet another example, an advertisement link undesired by the user is usually located on the top of a webpage, and what is desired by the user is located in the middle of the webpage, the result being that the user has to drag the webpage in order to view the desired contents.

Due to these shortcomings, browsing inconvenience is brought to the user. Moreover, as a result of opening webpages undesired by the user or displaying contents undesired by the user, time is unnecessarily consumed and network traffic and network burden are increased.

Therefore, it would be desirable to provide a technique for enhancing webpage browsing which can make the user's browsing more convenient by automatically adding links into webpages.

It should be noted that, the terms "webpage" and "page" referenced in the disclosure are not limited to contents accessed over the network, but can include contents browsed and/or processed locally which can be accessed to even if without network connection. For example, the webpage referenced in the disclosure can be a webpage browsed offline, a webpage developed and previewed by the developer locally, etc.

Figure 1:
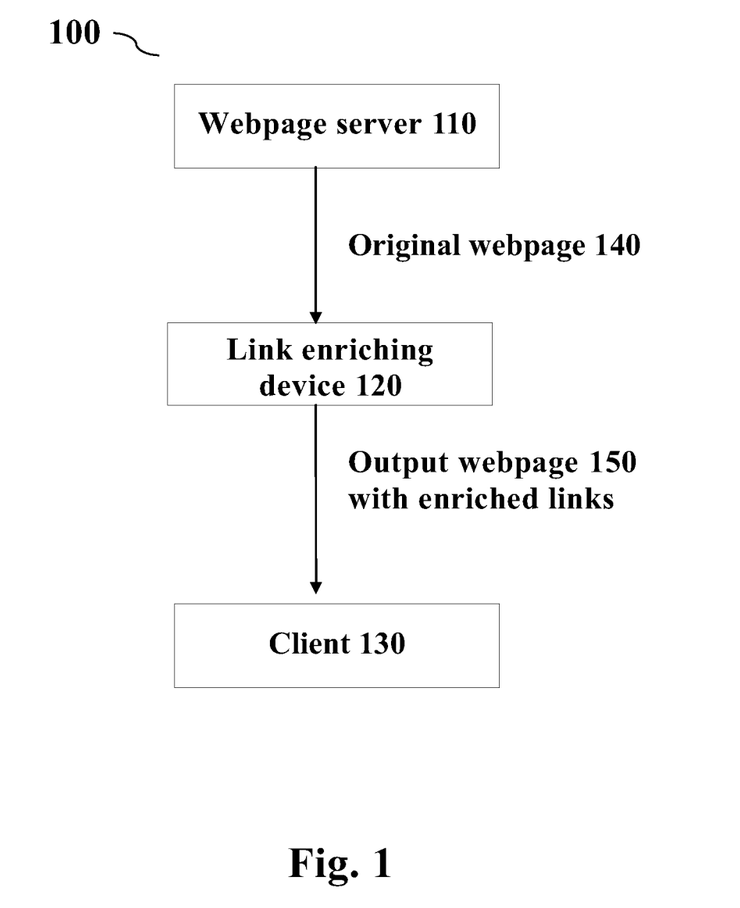
FIG. 1 shows an exemplary system environment according to an embodiment of the invention.

FIG. 1 shows an exemplary system environment according to an embodiment of the invention.

The system 100 can include a webpage server 110, a link enriching device 120 and a client 130. The webpage server 110 can provide the client 130 with webpages over the network. For the sake of simplicity, FIG. 1 only shows one webpage server 110 and one client 130, but in fact, there can be more servers and/or clients. Moreover, although the webpage server 110 and the client 130 are used in FIG. 1 for describing the invention, it will be appreciated that, the webpage server 110 can be replaced with any page providing device capable of providing a page or document, and the client 130 can be replaced with any page browsing device. Moreover, the page providing device and the page browsing device can be connected with each other by, for example, a local area network (LAN), a wide area network (WAN), a wireless local area network, a Wi-Fi® network, a Bluetooth® network, a mobile phone network, or a combination thereof, or can be located in the same site or in same apparatus.

The client 130 can include for example a mobile phone, a personal computer, a personal digital assistant (PDA), a laptop computer or other types of computing or communication devices, and may also include applications or programs running on the devices or objects that can be executed by the devices. For example, the client 130 can be a portable electronic device, or a browser located in the portable electronic device.

The link enriching device 120 can be used for processing a webpage provided by the webpage server 110 and generating a webpage having enriched links. Here, the webpage provided by the webpage server 110 is called an original webpage 140, and the webpage generated by the link enriching device 120 is called an output webpage 150. Although the link enriching device 120 is shown in FIG. 1 as a device separate from the client 130 and the webpage server 110, alternatively, the link enriching device 120 can be located in the client 130 or serve as a part of the client 130, can be located in the webpage server 110 or serve as a part of the webpage server 110, or can include a plurality of components located at different positions and performing different functions.

Each webpage can include one or more blocks. Here, blocks refer to modules that are obtained by parsing a webpage according to the hierarchy of the webpage. For example, as for the webpage, each webpage can be parsed into a XML structure, or into any other possible structures according to the format of the webpage, such that the blocks of the webpage can be defined according to respective nodes in the XML structure (or other possible structures). CSS technology or computer vision technology can also be used for distinguishing the blocks of the webpage. Granularity of the blocks can be pre-defined or dynamically adjusted according to the type, format, content, etc. of the webpage. A block can be, for example, a picture, a blog, a passage, a video clip, a post, etc. In an embodiment of the invention, each webpage can be decomposed into one or more blocks, and the block is used as a constituent of the webpage.

According to an embodiment, when a user browses a webpage by using the client 130, the client 130 can acquire data about the webpage browsing by the user. For example, the client 130 can acquire the user's current browsing data in a background process, and locally record the data as a log file or record the data in a particular data structure. Each record event can be triggered by a change in the state of the browser and/or the webpage. The browsing data can include, but is not limited to: browsed webpages, browsed blocks, duration of browsing each webpage/block, an event that causes change in the state of the browser and/or webpage (e.g., clicking a link, minimizing the browser), etc. It will be appreciated that, the above recording manners and recorded data are given only as examples. In facts, various known methods of acquiring and recording webpage browsing data in the art can be applied to the invention. The recorded browsing history data can be used as training data in a subsequent learning process or for other purposes. Examples of learning by using the browsing history data will be described in detail below.

According to an embodiment, if the link enriching device 120 is not located at the client 130 or is not entirely located at the client 130, after the client 130 has acquired and/or recorded the user's browsing history data, it can transfer the browsing history data to the link enriching device 120. According to an embodiment, an identifier for identifying the client 130 and/or information on the user can be transferred to the link enriching device 120 together with the browsing data acquired by the client 130. According to another embodiment, an agreement of transferring browsing data to the link enriching device 120 can be signed when installing the client 130. It will be appreciated that, the client 130 can transfer the acquired and/or recorded user browsing data to any device as needed, which is well known to those skilled in the art and thus is omitted here.

Figure 2:
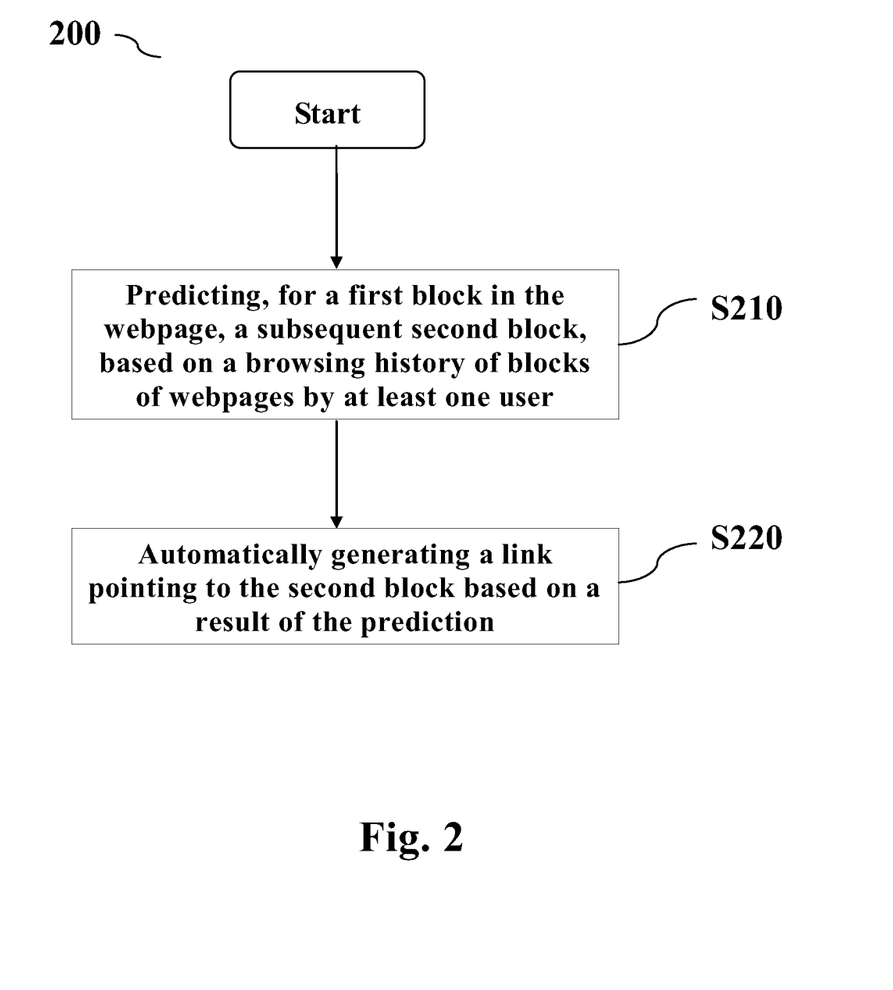
FIG. 2 is a flow chart showing a method 200 for enhancing webpage browsing according to an embodiment of the invention.

FIG. 2 is a flow chart showing a method 200 for enhancing webpage browsing according to an embodiment of the invention. The method 200 can be performed by, for example, the link enriching device 120 in FIG. 1, or performed by the link enriching device 120 in conjunction with other devices.

The method 200 starts from step S210 of predicting, for a first block in the webpage, a subsequent second block based on a browsing history of blocks of webpages by at least one user. According to an embodiment, the browsing history of blocks of webpages by at least one user can be chronological browsing orders of the blocks of webpages by the at least one user. The at least one user can be a great number of users, particular user(s), or a combination of both. If the browsing history is based on a great number of users, the prediction result here can be called a general prediction result which can be generally applied to all users. If the browsing history is based on particular user(s), the prediction result here can be called a customized prediction result which can be applied to the particular user(s) or users associated with the particular user(s) (for example, having similar browsing habits, having the same interest, belonging to the same company, etc). The two predicting modes can also be combined. For example, the customized prediction result can be utilized for adjusting the general prediction result, thereby providing a more accurate prediction result for the particular user(s).

The prediction in step S210 can be performed by using the blocks of the webpage as the units to be predicted. This can provide a prediction result with a higher precision compared with the prediction by using a whole webpage as the unit to be predicted, thereby better satisfying the user's demands. The second block can be located in the same webpage with the first block, or can be located in a different webpage from the first block.

The browsing history of blocks of webpages used in step S210 can be the browsing history of the webpage to be predicted, or browsing histories of other webpages, e.g., browsing histories of webpages similar to the webpage to be predicted. For example, if a great number of users (or particular users, if desired) browsed a second block after having browsed a first block in a webpage, it can be predicted for the first block in the webpage that the subsequent block is the second block. In another example, a prediction can be made for the blocks of the current webpage to be predicted based on chronological browsing orders of blocks of other webpages correlated with the current webpage to be predicted. Here, "correlated with" can mean that, for example, the correlated webpages have similar webpage structure, have similar contents, be of the same webpage type, belong to the same website, etc.

Next, the method advances to step S220 of automatically generating a link pointing to the second block based on the prediction result of the step S210. The link can be embedded in the first block, or located in another block or in a newly generated block.

For example, after it is predicted for the first block in the webpage that the subsequent block is the second block, a link pointing to the second block can be generated in the webpage. The link can be located in a newly generated block to be displayed nearby the first block. More preferably, the link can be embedded in the first block such that the link to the second block can be triggered by an event aimed at the first block. For example, the second block can be displayed by a user clicking the first block and the second block can be made to display in the center of the screen in an appropriate size. This is particularly advantageous in the case where the size of the display screen is limited, because after the user has browsed a block, the user can easily click directly on the block and thereby enter a subsequent block to be browsed, without the need of searching the webpage for a small or unapparent scrollbar or link icon.

It can be learned from the above description that, the method 200 can automatically process the original webpage provided by, for example, the webpage server and add links into the original webpage in order to, on one hand, alleviate the web developer's burden, and on the other hand, enable the user to easily enter subsequent browsing block(s). Moreover, since the prediction is made based on users' chronological browsing orders, compared with links artificially added by the webpage developer while designing the webpage, the links predicted based on the method 200 can better satisfy the user's browsing habits and actual needs.

Figure 3:
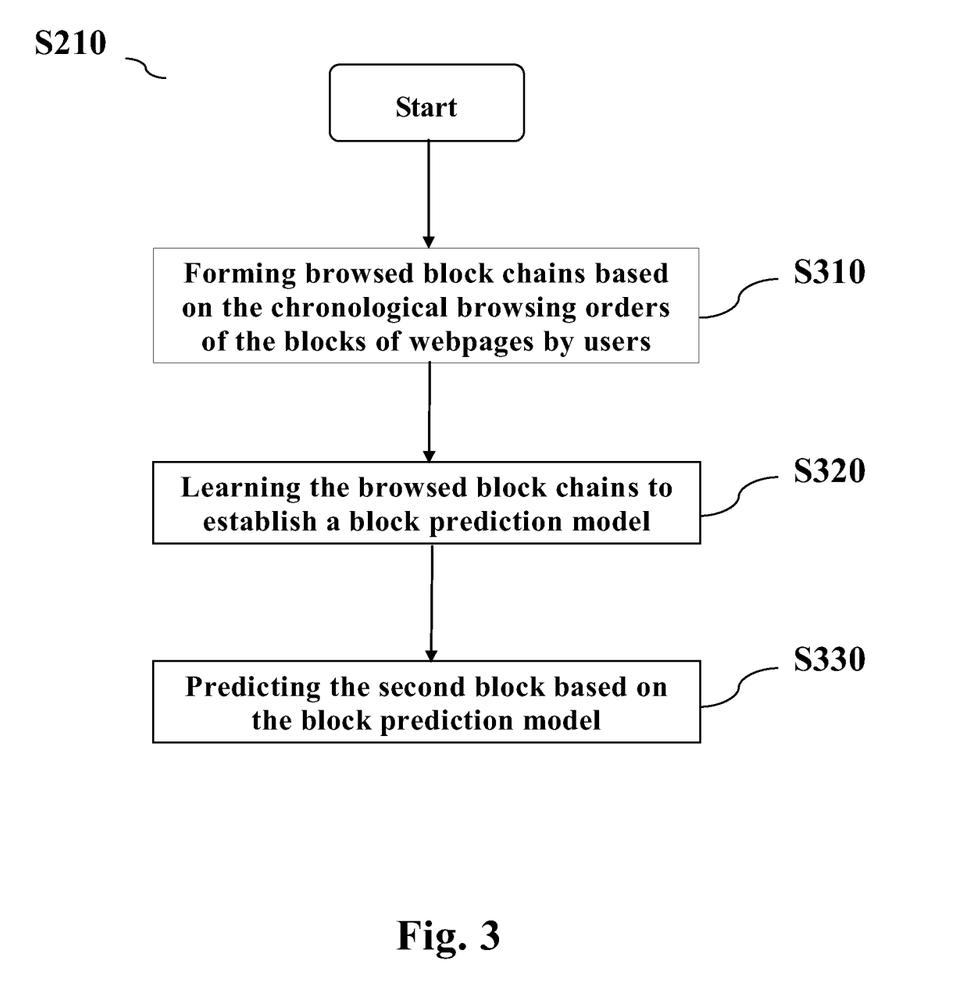
FIG. 3 shows details of the step S201 in FIG. 2.

The step S210 will be described more specifically below. FIG. 3 shows details of the step S201 in FIG. 2.

In step S310, one or more user's browsed block chains can be formed based on the user's chronological browsing orders of the blocks of webpages.

As described before, a webpage can be parsed into one or more blocks according to the hierarchy of the webpage. Accordingly, blocks browsed and/or clicked by a user while browsing a group of webpages can be detected from the user's browsing history, then the blocks are arranged based on the chronological order of browsing and/or clicking the blocks by the user, and thus a browsed block chain of when the user was browsing this group of webpages is formed.

In the step S320, a great number of browsed block chains can be learned to establish a block prediction model which can be used for predicting, for the current block, subsequent one or more blocks that will most probably be browsed by a user.

The browsed block chains formed in step S310 can serve as the training data for learning. In an example, learning is done based on a great number of users' browsed block chains, to thereby form a general prediction model. In another example, learning is done based on browsed block chains of particular user(s) to thereby form a customized prediction model. Learning can also be done based on both the browsed block chains of a great number of users and the browsed block chains of particular user(s), to thereby make adjustment to the general prediction model according to the learning results from the particular user(s), or make adjustment to the customized prediction model according to the learning results from a great number of users. In this way, a user can perform browsing according to browsing habits of the public or according to browsing habits specific to individual(s) (e.g., his/her own habit).

The learning in step S320 can adopt various learning mechanisms known to those skilled in the art, for example, KNN (K-Nearest Neighbor Algorithm), NB (Naive Bayesian Algorithm), SVM (Support Vector Machine) and so on, to form the block prediction model. Size, position, content, importance of the blocks in a browsed block chain, relative position and content similarity between blocks, etc, can be used as parameters of blocks for learning. In an example, the block prediction model can include a series of prediction rules adapted to different types of webpages and/or blocks. For example, for a webpage containing a plurality of images of a normal size, the block prediction model can specify that a subsequent block of each image (in the example, each image can be regarded as a block) is an image to the right of it or below it and nearest to it; whereas for a webpage including a plurality of thumbnails, the block prediction model can specify that a next block of each thumbnail (in the example, each thumbnail can be regarded as a block) is an image of original size corresponding to the thumbnail.

In an embodiment, the learning process in steps S310 and S320 can be dynamic, to thereby obtain an increasingly updated prediction model. Steps S310 and/or S320 can be executed by the link enriching device 120 in FIG. 1, or by a separate prediction model server. As described before, the link enriching device 120 and/or the prediction model server can possess user browsing history data received from the client 130 such that learning can be made based on the user browsing history data. If it is the prediction model server that performs the above learning process, the prediction model server can release a latest prediction model periodically or on request to the link enriching device 120 for the use of prediction. With the help of the dynamically updated prediction model, the prediction result can be adjusted according to the latest user browsing data such that the prediction is more accurate. Moreover, before the learning in step S320, an initial block prediction model can be pre-defined and then adjusted according to the learning results.

In step S330, the second block is predicted based on the block prediction model. The prediction of the second block can be based on the pre-defined initial block prediction model or based on the block prediction model that is obtained or updated through learning.

Step S330 can be executed by the link enriching device 120 in FIG. 1. In step S330, features of the webpage of which the first block belongs to (e.g., type of the webpage, the website publishing the webpage, etc.) and features of the first block (e.g., type of the first block, position of the first block in the webpage, content of the first block, etc.) can serve as inputs to the block prediction model for prediction. The prediction result can be one block or a plurality of blocks. An optimal block can be selected from the prediction result as the predicted second block; or a predetermined number of blocks can be selected from the prediction result as the predicted plurality of second blocks. For example, a certain accuracy threshold can be set for the prediction result, such that, for example, only blocks whose prediction accuracy is larger than the threshold can be selected from the prediction result as the predicted second blocks. If there is more than one predicted second block, priorities of the predicted second blocks can be ranked according to a certain rule. For example, the ranking can be performed according to the prediction accuracy or according to the type of the blocks, e.g., in an order of image blocks, video blocks, and text blocks. It will be appreciated that the rule of ranking the second blocks is not limited to these.

The steps in FIG. 3 can be further optimized. According to an embodiment, a browsed block chain containing only focused blocks can be formed in step S310.

Here, focused blocks refer to those blocks focused by a user, such as images, texts, blogs, videos the user is interested in when browsing a webpage. In contrast, non-focused blocks refer to those blocks that have been displayed to the user but the user is possibly not interested in. Obviously, the focused blocks are a subset of the browsed blocks.

If prediction is performed based on the block prediction model that is established by learning the browsed block chains composed of the focused blocks, the obtained second block(s) is/are the focused block(s) which contain contents that a user is truly interested in. By adding into the webpage links to such a second block, the user can skip those unfocused blocks that would have to be encountered in normal browsing but that user is not interested in. In this way, the user's browsing becomes more effective and convenient and can save network traffic and alleviate network burden.

How to form the browsed block chain composed of focused blocks in step S310 will be described in more detail below.

According to an embodiment of the invention, first the focused blocks can be identified from a user's browsing history. According to an embodiment of the invention, it can be judged whether or not a block is a focused block according to the feature of the block. For example, focused blocks and unfocused blocks can be distinguished from each other according to the size of the block, frequency of occurrence of the block, position of the block in the webpage, dwell time of the block, content correlation between adjacent blocks, operation performed on the block, type of the block (e.g. image, text, video, advertisement, etc), and others. For example, if a block is located in the center of the webpage, and/or the user performs a drag or zoom in operation on it, such a block can be identified as a focused block; if a block is highly correlated with a block previously browsed, and/or it appears on the screen for a long time, it can be identified as a focused block. In contrast, if a block appears for a very short time, it can be identified as an unfocused block; if a block is located at the edge of the webpage, and/or the block has a small size, it can be identified as an unfocused block.

After the focused blocks have been identified, they can be arranged according to the browsing chronological order to form a browsed block chain.

Alternatively, firstly, the blocks browsed by the user can be arranged according to the browsing chronological order to form a browsed block chain containing both focused blocks and unfocused blocks, and then the unfocused blocks are removed therefrom to obtain a browsed block chain containing only the focused blocks.

Steps after forming the browsed block chain composed of the focused blocks in step S310 are identical with steps S320 and S330 and thus are omitted here.

Figure 4:
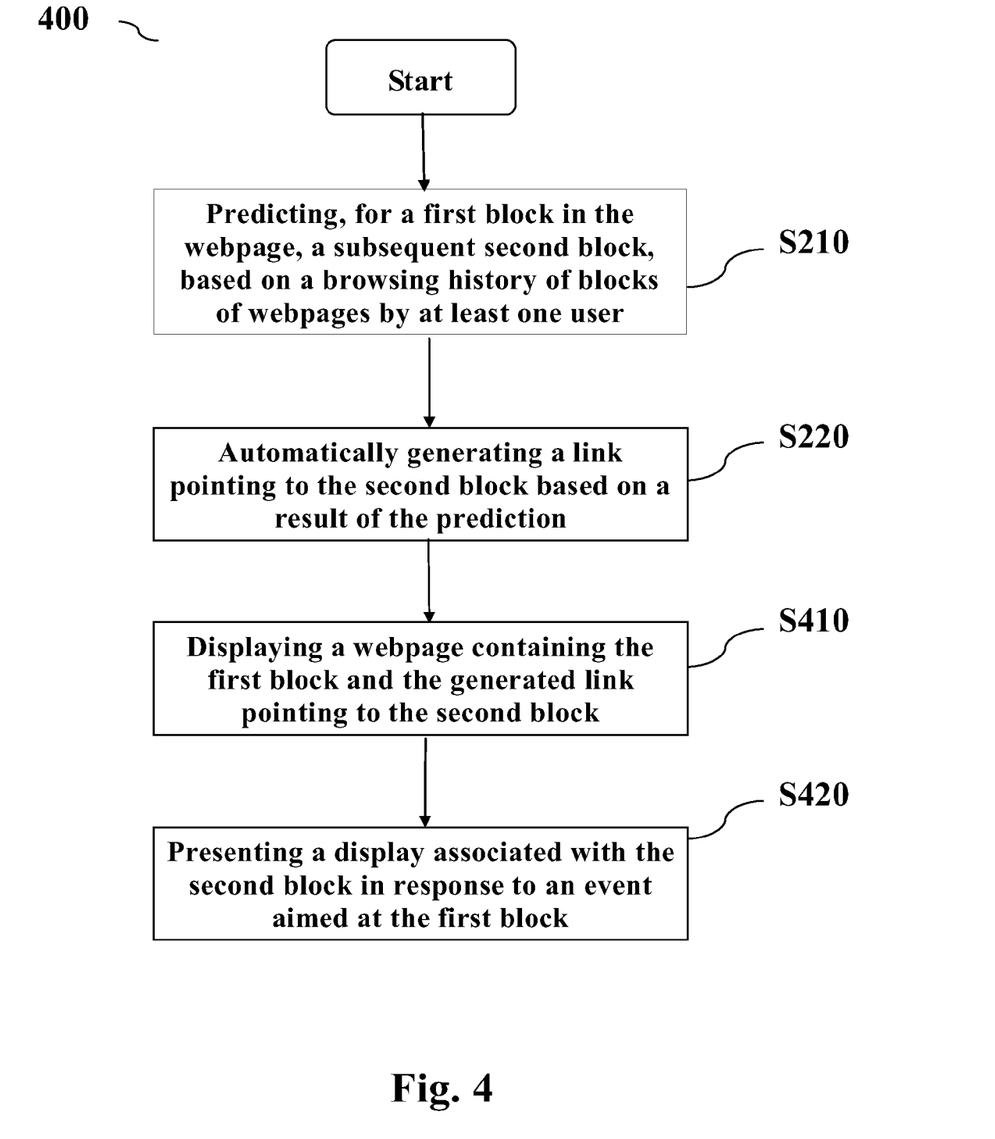
FIG. 4 is a flow chart showing a method 400 for enhancing webpage browsing according to an embodiment of the invention.

Returning to FIG. 2, the method shown in can further include some other steps. For example, as shown in FIG. 4, steps S410 and S420 in FIG. 4 can be executed after step S220.

In step S410, a webpage containing the first block and the generated link pointing to the second block can be displayed, such as the output webpage 150 with enriched links shown in FIG. 1. The output webpage 150 is used as an example for description below.

According to the various embodiments of the invention, the link pointing to the second block can be provided in the output webpage 150 in various forms.

For example, the link pointing to the second link can be displayed nearby the first block or floating over the first block, in a form of a newly added clickable icon.

For another example, instead of displaying the link as a newly added icon, the link can be invisibly embedded in the first block, such that the link can be triggered by an event aimed at the first block. This way can keep the display of the output webpage 150 having enriched links the same as the original webpage 140 and thus will not affect the normal browsing of the user. In this way, the user can browse the new webpage according to his or her usual habits, just like browsing the original webpage. Moreover, in this way, no displayed contents will be added, deleted or modified to/from/on the webpage. Therefore, this way will not affect the integrity, layout and style of the webpage and the webpage will remain tidy and aesthetically appealing, which is particularly useful for a device whose display screen is size-limited, e.g., a portable electronic device.

In step S420, a display associated with the second block is presented in response to an event aimed at the first block.

The event aimed at the first block can include e.g., clicking the first block, moving the mouse over the first block, expiration of a timer, etc.

Presenting a display associated with the second block in response to the event aimed at the first block can include for example, displaying the second block and zooming it into a size suitable for the display screen; displaying the link pointing to the second block; displaying a prompt about the second block, such as displaying "click to enter block A" to prompt the user that clicking the first block causes entrance to the second block A; displaying a plurality of links for selection by the user when there are more than one second blocks predicted; and the like.

The events and responses thereto can be pre-defined or can be customized by the user during the usage. For example, the user can customize that the second block is displayed in the center of the screen when the mouse double-clicks the first block. In this way, the user can easily click or select to enter a subsequent block to be browsed while browsing the current block, without the need of looking for the scrollbar or a non-obvious link icon on the webpage or the case of reaching the desired block through multiple links.

The implementations of the invention will be described below still by taking a webpage as an example, with reference to FIGS. 5 and 6.

Here, assume that the prediction model server learns how to establish a block prediction model and periodically sends the updated block prediction model to the client, and the client's browser predicts the second block based on the block prediction model, generates a link pointing to the second block, and displays, to the user, a webpage containing the newly generated link. It should be noted that, the embodiments shown in FIG. 5 and FIG. 6 are described only for the purpose of illustration rather than limiting the invention. Unless explicitly stated, the steps in the following embodiments are not all necessary and can be added, modified or deleted as needed. The executing order of the steps can also be adjusted as needed.

Figure 5:
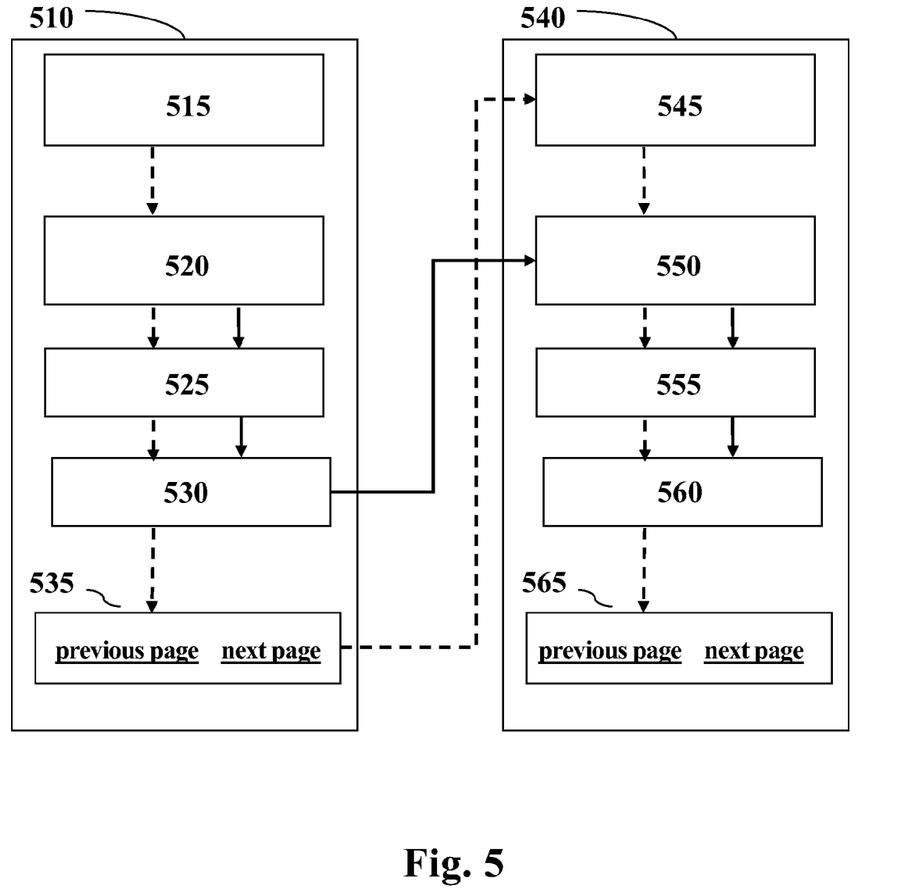
FIG. 5 shows an implementation of the method for enhancing webpage browsing according to an embodiment of the invention.

As shown in FIG. 5, assume that the webpage to be processed is 510. The webpage 510 is provided by the webpage server to the client's browser, and then is processed by the browser to provide to the user for browsing. The processing of the browser includes generating predicted links for the blocks in the webpage 510. The webpage 510 includes five blocks: block 515 containing advertising contents, block 520 containing text contents, blocks 525 and 530 containing image contents, and block 535 containing the page number. The positions of the five blocks in the webpage 510 are shown in FIG. 5. Assume that "next page" in the page number block 535 in the webpage 510 points to webpage 540 which also includes five similar blocks, i.e., block 545 containing advertising contents, block 550 containing text contents, blocks 555 and 560 containing image contents, and block 565 containing the page number, respectively. Here, for the sake of simplicity, assume that webpages 510 and 540 each include the above five blocks, but in practice, they can include more or less blocks, and they can have different numbers of blocks from each other.

The client's browser will generate, for the respective block in the webpage 510, a link pointing to the next block based on the block prediction model stored in the client. The block prediction model can be pre-defined, or can be obtained through learning by the prediction model server based on a large amount of training data. The prediction model may learn from various webpages such that it can be used for predicting different types of webpages. Here, however, only the learning from the webpage 510 and predicting for the webpage 510 are described as an example.

In the prediction model server, learning can be performed by using history data of browsing and/or clicking the webpages 510 and 540 or similar webpages by a great number of users on their respective browsers, to obtain a prediction rule for the webpages 510 and 540. For the convenience of description, here the browsing history of the webpages 510 and 540 are used as training data in describing the learning process, but it will be appreciated that, as described above, learning can be performed based on similar webpages, as discussed with reference to steps S210 and S320.

Firstly, browsed block chains of respective users are formed based on the respective users' chronological browsing orders of the blocks in the webpages 510 and 540 (e.g., step S310 in FIG. 3). According to an embodiment, assume that a block browsing order of a user is 515-520-525-530-535 (clicking "next page")-545-550-555-560-565, as indicated by the dashed arrows. The blocks can be linked up according to the browsing order as the user's browsed block chain with respect to the webpages 510 and 540. Optionally, a browsed block chain containing only the focused blocks that the user is interested in can be formed. For example, in an embodiment, it is discovered by analyzing the history data of the user that, blocks 515 and 545 as well as blocks 535 and 565 each appear on the screen of the client's browser for a time less than 5 seconds, so the four blocks can be identified as unfocused blocks and are removed from the initial browsed block chain (in fact, blocks 515 and 545 in the example are blocks containing advertising contents and blocks 535 and 565 are blocks containing page number), to thereby obtain a browsed block chain containing only the focused blocks: 520-525-530-550-555-560, as indicated by the solid arrow in FIG. 5. Alternatively, the focused blocks can be found out first from the blocks browsed by the user, and then are linked up according to the browsing order to form a browsed block chain containing only the focused blocks.

In this case, statistics and learning results from the great number of users' browsed block chains with respect to the webpage show that, 60% of the users have a browsed block chain of 515-520-525-530-535-545-550-555-560-565. Therefore, this browsing order can be used as a prediction rule for this webpage, or as a prediction rule for a webpage of this type, and the prediction accuracy can be defined as 60%. The prediction rule may serve as a part of the block prediction model. Note that, learning by using the browsed block chain containing both focused blocks and non-focused blocks is merely illustrative, and the browsed block chain containing only focused blocks can also be used for learning.

At the client's browser, prediction is made for the blocks based on the above prediction rule, to thereby generate a link pointing to the block 520 for the block 515 in the webpage 510, generate a link pointing to the block 525 for the block 520, generate a link pointing to the block 530 for the block 525, and so on.

Then, the browser presents to the user the webpage having the newly generated link. The above link is preferably embedded in the webpage file without being displayed to the user, such that the webpage having the newly generated link appears like the original webpage. A difference only lies in that, the user can click the blocks to activate the hidden links. For example, when the block 520 is clicked, the block 525 is displayed in the center of the screen. Alternatively or in addition, the display can be updated in response to other events. For example, when the mouse is located over the block 520, a prompt such as "click to enter block 525" can be displayed. In this way, even if the block 520 (containing text contents) and the blocks 525 and 530 (containing image contents) have relative large areas, the user can easily enter a next block to be browsed by clicking directly on the current block, without the need of dragging the scrollbar or looking for a small "next page" icon, which enhances continuity and convenience of the browsing. This is particularly beneficial to the portable electronic device with a touch screen, because such a device is usually operated by finger instead of mouse and thus has a low locating accuracy. As a result, the scrollbar or small icon cannot be accurately selected or manipulated; moreover, since the screen is small, it is needed to scroll throughout the whole webpage to reach the "next page" icon at the bottom of the webpage.

According to an embodiment, learning and prediction can be also made by using the browsed block chains composed of focused blocks. The learning and predicting process is similar to that described above. For example, through learning, the browsing order 520-525-530-550-555-560 may serve as a prediction rule for the webpage or for a webpage of this type. Accordingly, at the client's browser, based on the prediction rule, a link pointing to the block 525 is generated for the block 520 in the webpage 510, a link pointing to the block 530 is generated for the block 525, a link pointing to the block 550 in the webpage 540 is generated for the block 530, and so on. Since the embodiment utilizes the browsed block chains composed of focused blocks for learning and prediction, it can obtain additional advantages, i.e., after the user has browsed the block 530, the block 550 that the user wishes to browse can be directly displayed in the center of the screen rather than displaying the block 545 containing advertising contents, which further enhances continuity of browsing and greatly improves the user's experience.

The above described ways of displaying and operating the webpage merely serve as examples, and those skilled in the art can think of other alternatives after reading the disclosure. For example, instead of clicking by the user, a timer can be set to update the display by automatically jumping after a predetermined time period. For example, if the block firstly displayed after the webpage 510 is opened is a block containing advertising contents, the display can automatically jump to the predicted next block subsequently.

It should be noted that, although in the above embodiments, the block prediction model is established by the prediction model server based on a great number of users' history data, the block prediction model can be generated or adjusted according to data of the particular user using the browser. For example, if it is discovered through learning the browsing history of the particular user at the client, the user only focuses on text contents rather than image contents while browsing a webpage such as the webpage 510, the prediction model can be adjusted for the user such that, a link pointing to the block 550 containing text contents in the next page is generated for the block 520 containing text contents, and the display of blocks 525 and 530 containing image contents are skipped.

Furthermore, in other implementations, it can be specified that, rules in which prediction accuracy is more than a certain threshold (e.g., 20%) can all be applied to the webpage 510. The threshold can be pre-defined by the prediction model, or can be set at the client according to the user's preference. Assume that there are 60% of users have the above-mentioned browsed block chain of 520-525-530-550-555-560 with respect to the webpages 510 and 540, and 30% of the users have a browsed block chain of 520-550. Then there are two corresponding prediction rules that have prediction accuracy of 60% and 30%, respectively. Correspondingly, two links pointing to the second block are generated for the block 520. When a user clicks on the block 520 or when the mouse is located over the block 520, both links respectively pointing to the webpage 525 and the block 550 are displayed for selection by the user. Alternatively, it can be specified that a predetermined number of predicted blocks can be applied, for example, 3 links with the highest prediction accuracy are generated. Moreover, a certain threshold, e.g., 20%, can be set, and when the prediction accuracy of any of the rules is less than the threshold, no new link is generated for the block.

Figure 6:
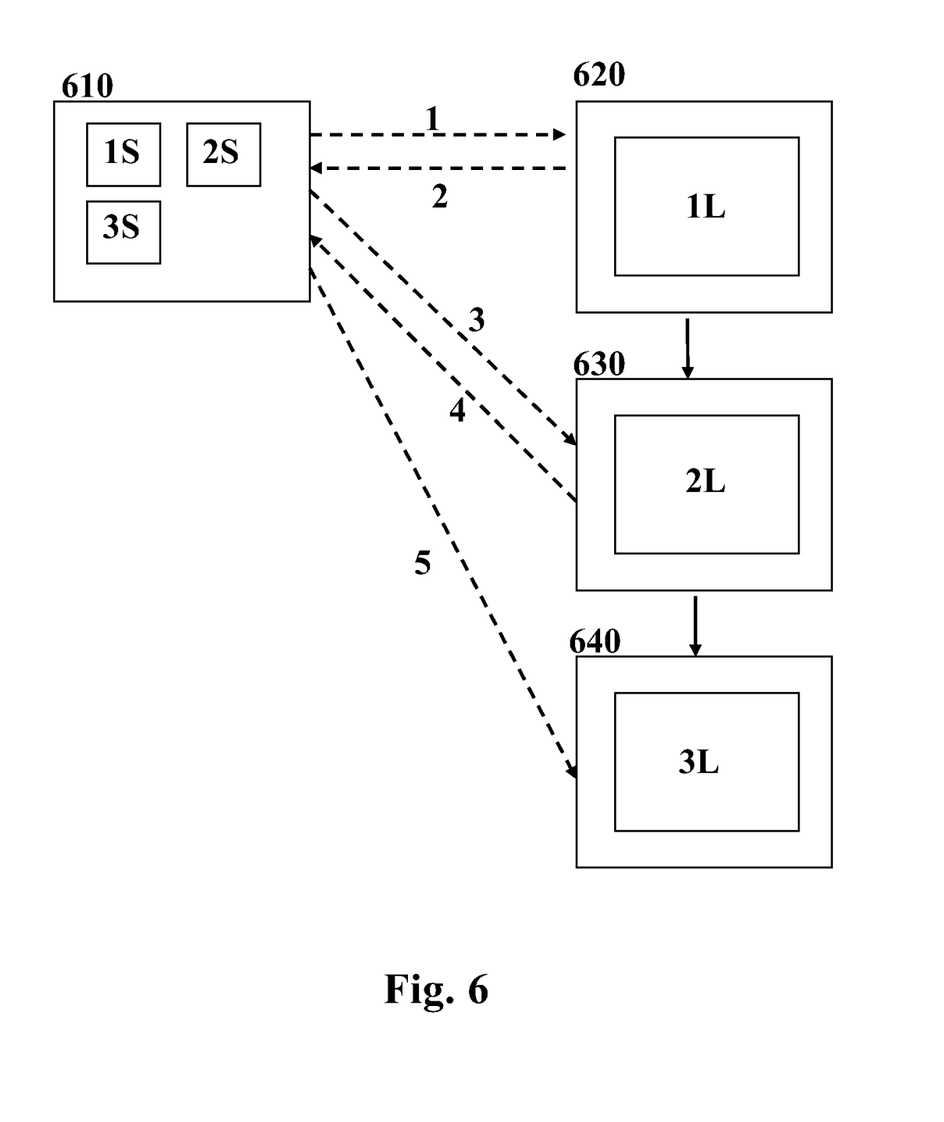
FIG. 6 shows another implementation of the method for enhancing webpage browsing according to an embodiment of the invention.

Turning now to FIG. 6, an embodiment will be described which shows a method for enhancing webpage browsing according to the invention. In order to avoid unnecessary repetition, only features different from FIG. 5 are described.

FIG. 6 shows a group of four associated blocks 610, 620, 630 and 640, wherein the block 610 contains 3 thumbnails 1S, 2S and 3S, and the blocks 620, 630 and 640 respectively contain enlarged displays 1L, 2L and 3L of the three thumbnails, e.g., corresponding large images having a higher resolution. The four blocks can be located in four different webpages.

Assume that a user browses these blocks with a browsing order of 610-620-610-630-610-640, as indicated by the dashed arrows 1-5 in FIG. 6. That is, each time the user finishes browsing a large image, the user returns to the block 610 containing the thumbnails, in order to click another thumbnail for viewing a large image corresponding to the other thumbnail. Moreover, it is found that the user stays on the block 610 for a very short time, so the block 610 can be identified as an unfocused block, and an optimized browsed block chain containing only focused blocks is obtained: 620-630-640, as indicated by the solid arrows in FIG. 6. It is discovered through learning that, 70% of users use the above browsed block chain in browsing, so this browsing order can be used as a prediction rule for the blocks 610, 620, 630 and 640. Accordingly, a link pointing to the block 630 is generated for the block 620, a link pointing to the block 640 is generated for the block 630, and so on.

In the implementation, for example, when processing the webpage containing the block 610, links pointing to the blocks 630 and 640 can be retrieved from the code of the webpage and stored, and then the stored data are used for generating new links respectively when processing the webpage containing the blocks 620 and 630. In this way, by clicking the first large image 1L, the second large image 2L can be directly viewed, and by clicking the second large image 2L, the third large image 3L can be directly viewed, without repeatedly returning to the block 610 containing the thumbnails, which saves time, traffic, and makes browsing smoother. Moreover, since the new links can be automatically generated by the client's browser according to the stored prediction model, it does not need the webpage developers to pay out additional manual efforts while creating the webpage, so the burden of the webpage developers is greatly reduced while bringing greater convenience to the users.

Figure 7:
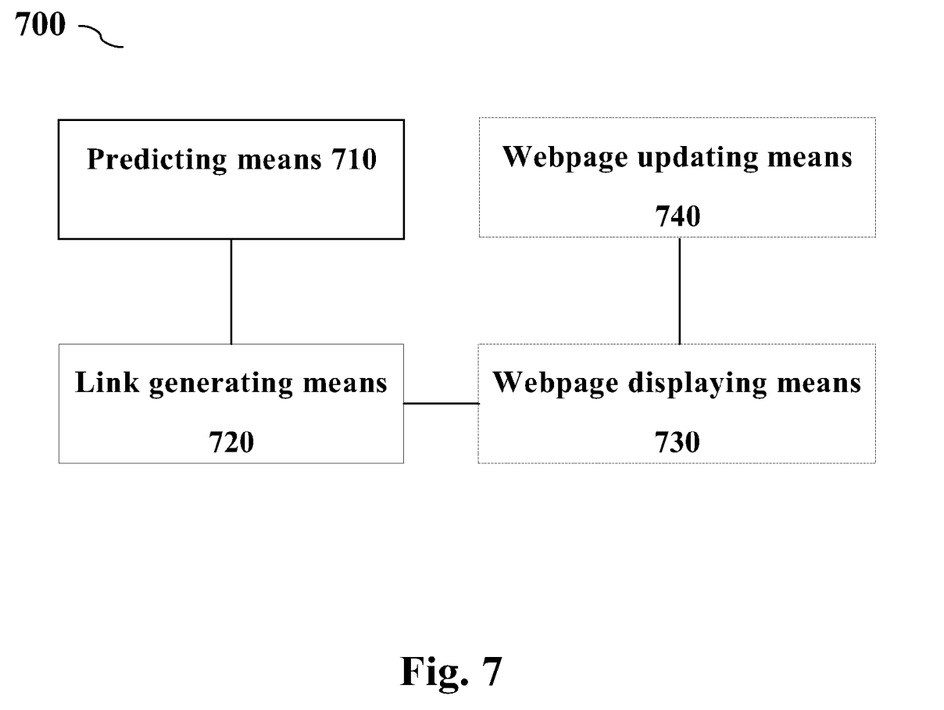
FIG. 7 is an illustrative block diagram showing an apparatus 700 for enhancing webpage browsing according to an embodiment of the invention.

FIG. 7 is an illustrative block diagram showing an apparatus 700 for enhancing webpage browsing according to an embodiment of the invention. The various means shown in FIG. 7 can be implemented by hardware, software or a combination thereof.

As shown in FIG. 7, the apparatus 700 can include predicting means 710 and link generating means 720. Optionally, the apparatus 700 may further include webpage displaying means 730 and webpage updating means 740.

The predicting means 710 can predict, for a first block in a webpage, a subsequent second block, based on a browsing history of blocks of webpages by at least one user, and can provide a predicted result to the link generating means 720. The link generating means 720 can automatically generate a link pointing to the second block based on the prediction result. According to an embodiment, the browsing history of blocks of the webpages by the at least one user can be chronological browsing orders of the blocks of the webpages by the at least one user.

The webpage displaying means 730 can display a webpage containing the first block and the generated link pointing to the second block. The link pointing to the second block may exist in the displayed webpage in various forms. Preferably, the link is not displayed as a newly added icon, but is invisibly embedded in the first block, such that the link can be triggered by an event aimed at the first block.

The webpage updating means 740 can perform a display associated with the second block in response to the event aimed at the first block, to thereby update the displayed webpage. As mentioned before, the event aimed at the first block can include for example, clicking the first block, moving the mouse over the first block, expiration of a timer, etc. Performing the display associated with the second block can include for example, displaying the second block, displaying the link pointing to the second block, displaying a prompt about the second block, displaying a plurality of links for selection by the user when there are more than one second blocks predicted, and so on.

Figure 8:
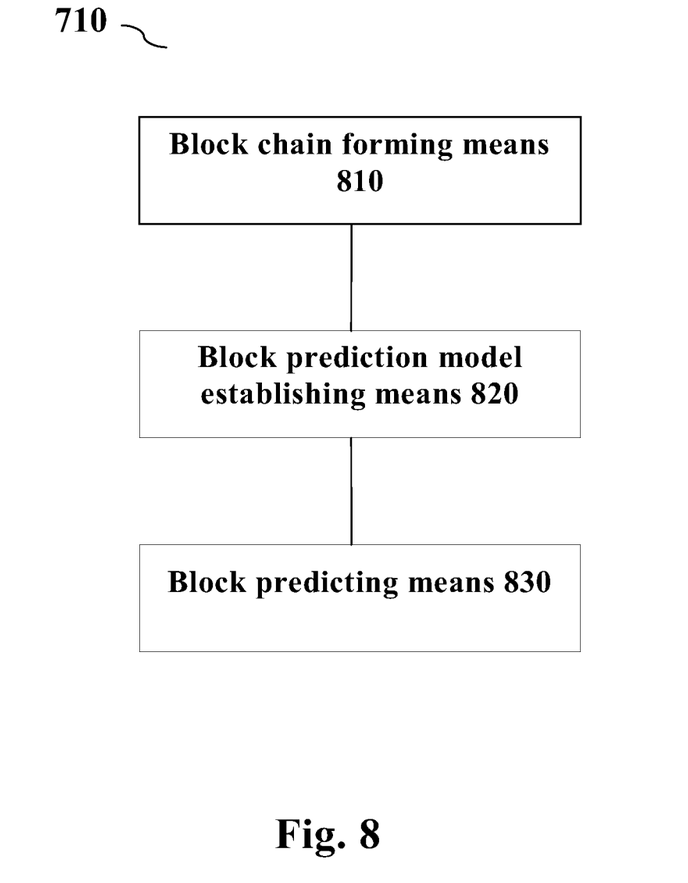
FIG. 8 is an illustrative block diagram showing the predicting means 710 in FIG. 7 according to an embodiment of the invention.

FIG. 8 is an illustrative block diagram of the predicting means 710 in FIG. 7 according to an embodiment of the invention. The various means shown in FIG. 8 can be implemented by hardware, software or a combination thereof.

As shown in FIG. 8, the predicting means 710 can include block chain forming means 810, block prediction model establishing means 820 and block predicting means 830.

The block chain forming means 810 in the predicting means 710 can form browsed block chains based on chronological browsing orders of the blocks of the webpages by the users. The block prediction model establishing means 820 can learn from the browsed block chains to establish a block prediction model.

As described before, the block prediction model can be pre-defined or established through learning. The block prediction model established through learning can be a general block prediction model that is established by learning a great number of users' history data, or a customized block prediction model that is established by learning the history data of particular user(s) (e.g., the user of the apparatus 700). Alternatively, the block prediction model can be formed by combining the above two learning processes.

Furthermore, referring to the above description, the block chain forming means 810 can form a browsed block chain containing all the browsed blocks, or form a browsed block chain containing only focused blocks. According to an embodiment, focused blocks and unfocused blocks can be distinguished from each other according to at least one of: the size of the block, occurrence frequency of the block, position of the block in the webpage, dwell time of the block, content correlation between adjacent blocks, operation performed on the block, and the type of the block.

The block predicting means 830 can predict, for the first block in the webpage, a subsequent second block according to the block prediction model. The webpage can be a webpage provided by the webpage server to the electronic apparatus 700, or a webpage provided by an application running on the apparatus 700.

The block chain forming means 810, block prediction model establishing means 820 and the block predicting means 830 in FIG. 8 can be located in the same apparatus, e.g., all in the client or client's browser. Alternatively, they can be located in different apparatuses. For example, the block predicting means 830 can be located in the client, whereas the block chain forming means 810 and the block prediction model establishing means 820 can be located in a separate prediction model server.

It should be appreciated that, the above embodiments are given only for the convenience of understanding the principle of the invention by those skilled in the art, and they should not be construed as limiting the invention.

As will be appreciated by one skilled in the art, aspects of the present invention can be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "device", "apparatus", "means" or "system." Furthermore, aspects of the present invention may take the form of a computer program product embodied in any tangible medium of expression having computer usable program code embodied therein.

Any combination of one or more computer usable or computer readable medium(s) can be utilized. The computer usable or computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium supporting for example the Internet or Intranet, or a magnetic storage device. Note that the computer usable or computer readable medium even can be paper or other suitable medium on which programs are printed, and this is because the programs can be obtained electronically by electrically scanning the paper or other medium, and then be compiled, interpreted or processed appropriately, and be stored in a computer memory if necessary. In the context of this document, a computer readable or computer readable storage medium can be any medium that includes, stores, communicates, propagates, or transmits a program for use by or in connection with an instruction execution system, apparatus, or device. A computer readable medium can include computer readable program code embodied therein, propagated in baseband or as part of a carrier wave. The computer readable program code can be transmitted using any appropriate medium, including but not limited to wireline, optical fiber cable, etc.

Computer program code for carrying out operations for aspects of the present invention can be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products, specifically FIGS. 2 and 7, according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

These computer program instructions may also be stored in a computer readable medium that can direct a computer or other programmable data processing apparatus to function in a particular manner, such that the instructions stored in the computer readable medium produce an article of manufacture including instruction means which implement the functions/acts specified in the blocks of the flowchart illustrations and/or block diagrams.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the blocks of the flowchart illustrations and/or block diagrams.

The flowchart illustrations and block diagrams in the figures illustrate the architecture, functionality, and operation of possible implementations of systems, methods and computer program products according to various embodiments of the present invention. In this regard, each block in the flowchart illustrations or block diagrams may represent a module, program segment, or portion of code, which includes one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable those of ordinary skill in the art to understand the invention for various embodiments with various modifications as are suited to the particular use contemplated.

What is claimed is:

1. A method for enhancing webpage browsing, the webpage containing blocks of multimedia content, the method comprising:
   receiving, at a client, an input webpage from a webpage server;
   predicting, by a link enriching device located entirely in the client, for a first block in said input webpage, a subsequent second block, based on a browsing history of blocks of webpages by at least one user, the predicting including
      distinguishing focused blocks from unfocused blocks according to a dwell time of said block in said webpage,
      forming browsed block chains by arranging focused blocks among said blocks of webpages according to a chronological browsing order,
      learning said browsed block chains to establish a block prediction model,
      predicting a general prediction for said second block based on said block prediction model using said browsing history of blocks of webpages for more than one said user, and
      predicting a customized prediction for said second block based on said block prediction model using said browsing history of blocks of webpages for one said user or users associated with one said user;
   automatically generating, by the link enriching device located entirely in the client, a link pointing to said second block based on a result of said predicting; and
   generating, by the link enriching device located entirely in the client, an output webpage including said link pointing to said second block.

2. The method according to claim 1, further comprising removing unfocused blocks from said formed browsed block chains.

3. The method according to claim 1, further comprising:
   displaying, at the client, the output webpage; and
   displaying, at the client, another output webpage containing said second block, in response to an event aimed at said first block.

4. An apparatus for enhancing browsing of a webpage, the apparatus comprising:
   a processor, coupled to memory, capable of executing machine readable instructions for
   receiving, at a client, an original webpage from a webpage server;
   predicting, with a linking enriching device located entirely in the client, for a first block in said original webpage, a subsequent second block by a particular user, the predicting including
      distinguishing focused blocks from unfocused blocks according to a dwell time of each of said blocks in said original webpage,
      forming browsed block chains by arranging focused blocks among said blocks of said original webpage according to a chronological browsing order,
      learning said browsed block chains to establish a block prediction model,
      making a general prediction for said subsequent second block using said block prediction model and a browsing history of blocks of said original webpage for more than one user,
      making a customized prediction for said subsequent second block using said block prediction model and a browsing history of blocks of said original webpage for users associated with said particular user, and
      making a particular customized prediction for said subsequent second block using said block prediction model and a browsing history of blocks of said original webpage for said particular user;
   automatically generating, with the linking enriching device, a link pointing to said second block based on at least one of said general prediction, said customized prediction, and said particular customized prediction; and
   generating, with the linking enriching device, an output webpage including said link pointing to said second block.

5. The method according to claim 1, wherein the distinguishing the focused blocks from unfocused blocks includes distinguishing according to a size of said block.

6. The method according to claim 1, wherein the distinguishing the focused blocks from unfocused blocks includes distinguishing according to an occurrence frequency of said block.

7. The method according to claim 1, wherein the distinguishing the focused blocks from unfocused blocks includes distinguishing according to a position of said block.

8. The method according to claim 1, wherein the distinguishing the focused blocks from unfocused blocks includes distinguishing according to a content correlation between adjacent blocks.

9. The method according to claim 1, wherein the distinguishing the focused blocks from unfocused blocks includes distinguishing according to an operation performed on said block.

10. The apparatus according to claim 4, wherein the distinguishing the focused blocks from unfocused blocks includes distinguishing according to a size of said block.

11. The apparatus according to claim 4, wherein the distinguishing the focused blocks from unfocused blocks includes distinguishing according to an occurrence frequency of said block.

12. The apparatus according to claim 4, wherein the distinguishing the focused blocks from unfocused blocks includes distinguishing according to a position of said block.

13. The apparatus according to claim 4, wherein the distinguishing the focused blocks from unfocused blocks includes distinguishing according to a content correlation between adjacent blocks.

14. The apparatus according to claim 4, wherein the distinguishing the focused blocks from unfocused blocks includes distinguishing according to an operation performed on said block.

15. The apparatus according to claim 4, further comprising:

removing unfocused blocks from said formed browsed block chains.

16. The apparatus according to claim 4, further comprising:

displaying, at the client, the output webpage containing said first block; and displaying, at the client, in response to an event aimed at said first block, another output webpage containing said second block.

17. The method of claim 3, wherein the link pointing to said second block is invisibly embedded in said first block, such that the link can be triggered by an event aimed at said first block.

18. The apparatus of claim 16, wherein the link pointing to said second block is invisibly embedded in said first block, such that the link can be triggered by an event aimed at said first block.

19. The apparatus of claim 4, wherein the predicting includes making a correlated prediction based on chronological browsing orders of blocks of other webpages correlated with the original webpage, and wherein the step of automatically generating, with the linking enriching device, a link pointing to said second block is based on a result of at least one of said general prediction, said customized prediction, said particular customized prediction, and said correlated prediction.

* * * * *